US012087250B2

(12) United States Patent
Greimel-Laengauer

(10) Patent No.: US 12,087,250 B2
(45) Date of Patent: Sep. 10, 2024

(54) AMBIENT LIGHT SENSING SYSTEMS

(71) Applicant: ams AG, Premstätten (AT)

(72) Inventor: Bernhard Greimel-Laengauer, Hofstätten an der Raab (AT)

(73) Assignee: AMS AG, Premstätten (AT)

( * ) Notice: Subject to any disclaimer, the term of this patent is extended or adjusted under 35 U.S.C. 154(b) by 0 days.

(21) Appl. No.: 17/781,537

(22) PCT Filed: Dec. 2, 2020

(86) PCT No.: PCT/EP2020/084266

§ 371 (c)(1),
(2) Date: Jun. 1, 2022

(87) PCT Pub. No.: WO2021/110745

PCT Pub. Date: Jun. 10, 2021

(65) Prior Publication Data

US 2022/0301519 A1 Sep. 22, 2022

Related U.S. Application Data

(60) Provisional application No. 62/943,648, filed on Dec. 4, 2019.

(30) Foreign Application Priority Data

Jul. 14, 2020 (GB) ...................................... 2010825

(51) Int. Cl.
*G09G 5/10* (2006.01)
*G09G 3/20* (2006.01)

(52) U.S. Cl.
CPC ............. *G09G 5/10* (2013.01); *G09G 3/2092* (2013.01); *G09G 2320/0626* (2013.01); *G09G 2360/144* (2013.01); *G09G 2360/145* (2013.01)

(58) Field of Classification Search
None
See application file for complete search history.

(56) References Cited

U.S. PATENT DOCUMENTS 9,622,326 B1 * 4/2017 Devyver .............. G09G 3/3406
2020/0066229 A1 * 2/2020 Zhu .......................... G09G 5/10
2021/0043130 A1 * 2/2021 Dai .......................... G09G 3/32

FOREIGN PATENT DOCUMENTS

EP 3522146 A1 8/2019

OTHER PUBLICATIONS

Njibamum, David (EP Authorized Officer), International Preliminary Report on Patentability in corresponding International Application No. PCT/EP2020/084266 mailed on May 17, 2022, 11 pages.

(Continued)

*Primary Examiner* — Andre L Matthews
(74) *Attorney, Agent, or Firm* — MH2 TECHNOLOGY LAW GROUP LLP

(57) ABSTRACT

A method of sensing a level of ambient light in an electronic device comprising sensing a combined light level of ambient light and light from the display, integrating this to determine an integrated light level, determining an integrated display light level, and compensating the integrated light level using the integrated display light level to determine the ambient light level. The device modulates the display between first and second brightness levels and determining the integrated display light level comprises sensing a combination of light from the display and ambient light when at each of the first and second brightness levels, determining a difference, and applying a calibration value to the difference to determine the integrated display light level.

15 Claims, 5 Drawing Sheets

(56) References Cited

OTHER PUBLICATIONS

Njibamum, David (EP Authorized Officer), International Search Report and Written Opinion in corresponding International Application No. PCT/EP2020/084266 mailed on Mar. 1, 2021, 13 pages.

* cited by examiner

AMBIENT LIGHT SENSING SYSTEMS

FIELD

This specification relates to systems for sensing ambient light level.

BACKGROUND

It is useful for electronic devices such as mobile phones to be able to sense ambient light level e.g. so that the display illumination can be controlled to reduce electrical power consumption. One technique for ambient light sensing is described in EP3370226A. An ambient light sensing technique which involves switching off the display is described in WO2014077950. An optical sensor arrangement is described in EP3401701A. It is desirable to be able to sense the ambient light level without switching off the display.

SUMMARY

This specification generally relates to techniques for sensing ambient light level in a portable electronic device with a light-emitting display screen. The sensed light level is affected by the display screen, especially if a light sensor is in close proximity to the display screen, e.g. behind the display screen. Techniques are described which can compensate for this.

In one aspect there is described a method of sensing a level of ambient light in an electronic device having an emissive display and a sensor. The method may comprise sensing, using the sensor, a combined light level of ambient light and light from the emissive display. The method may further comprise integrating the combined light level over an ambient light sensing time to determine an integrated light level. The method may further comprise determining an integrated display light level over the ambient light sensing time for the emissive display. The method may further comprise compensating, e.g. subtracting, the integrated light level using the integrated display light level to determine an ambient light level;

The electronic device may controls a display brightness of the emissive display by modulating the emissive display between first and second brightness levels e.g. using PWM (Pulse Width Modulation). Determining the integrated display light level may comprise sensing, using the sensor: a combination of light from the emissive display when at the first brightness level and the light level of the ambient light to determine a first sensed brightness level; and a combination of light from the emissive display when at the second brightness level and the light level of the ambient light, to determine a second sensed brightness level. Determining the integrated display light level may further comprise determining a difference between the first and second sensed brightness levels to suppress a contribution from the light level of ambient light. Determining the integrated display light level may further comprise applying a calibration value to the difference to determine the integrated display light level.

A light sensor may be used to measure an ambient light level but typically space is limited in an electronic device and depending on its location the sensor may also pick up light from the display. The method described herein can be used in such cases. Some implementations of the method are particularly useful where the sensor is located behind the display, but the technique can be used with the sensor in other positions.

The ambient light level can include a component varying at twice grid mains frequency and it is therefore desirable to integrate this out, or sample so quickly that the ambient light level does not change significantly between samples. Where the sensed light includes a component from the display this component can be subtracted off, but the display content may change over the integration period. It can therefore be desirable to sample the light from the display one or more times during the integration period. This sample can then be scaled up to determine what component of the integrated sensed light is from the display, and the integrated sensed light can then be compensated for the light from the display by subtracting the scaled up sample.

As described later, the integrated sensed light (display+ambient) may be designated intS. The corresponding (scaled up) component of the sensed light from the display may be designated intD. Then the integrated ambient light, intA, may be given by intA=intS=intD. The ambient light level is dependent upon (proportional to) the integrated ambient light, intA, and thus intA may be used directly as a measure of the ambient light level, or scaled by a factor which depends on the units of measurement.

In an electronic device with a PWM display, there are periods when part or all of the display is off. For example in some devices the complete display may be PWM modulated e.g. by controlling a power supply to one or more emissive elements of the display—that is i.e. all of a display region of the display may be turned on/off simultaneously. In some devices only part of the display may be PWM modulated at any one time. For example such a display may have a dark band across the display, which travels down the display; some devices may have more than one such dark band. The width of the band(s) may depend on the (overall) display brightness i.e. larger for a darker display, smaller for a brighter display. In some devices both approaches may be combined. Also or instead the magnitude of a power supply to the display may be controlled to adjust the display brightness, that is an overall brightness of the display, e.g. by controlling a current or voltage provided to the display.

Such techniques may be used with any type of emissive display e.g. an OLED (organic light emitting diode) display or an LCD (liquid crystal display). With an LCD display the (overall) display brightness may be controlled by controlling a brightness of a backlight of the display.

In one approach the light from the display may be sampled by briefly measuring the combined display+ambient light and afterwards, in a part of the PWM period where the display is off (or off at the sensor), similarly sampling just the ambient light. The ambient light sample may then be subtracted from the display+ambient light sample to obtain a sample of the display light output (because the ambient light may flicker the single ambient sample is not suitable for use by itself). However this approach has difficulties, for example where only part of the display is blanked during the PWM cycle, and can be inaccurate.

For example, the display brightness may not reduce to zero during the PWM cycle, or where the PWM involves a moving dark band the sensor may see light from either side of the band and may thus not see the light level fall to zero. In principle were the changes in display light level known two measurements could be subtracted to remove the ambient light component. For example were the overall display brightness to change from e.g. 80% to 20% of full brightness the sensed light level might change from (80%+ambient) to (20%+ambient) and subtraction would remove the ambient component. However in practice such percentages may not be known.

Implementations of the described techniques address these problems. Thus the light sensor is used to sense each of brightness levels of the emissive display, the method then determining a difference (to compensate for the ambient light level), and applying a calibration value, e.g. retrieved from storage, to the difference to scale up the difference for subtracting from the integrated i.e. total light level. For example the calibration value may multiply (or divide) the difference between the first and second sensed brightness levels. In this way multiple problematic effects may be compensated for simultaneously, such as the sensor capturing light from pixels to either side of a dark band, effects due to fading rather than instant turn-off of the display or part of the display, and effects on the sensed light levels due to the aperture of the sensor, its placement, and timing of the sensing. The technique may be used with PWM-based display brightness control whether or not the display brightness goes to zero during the “off” periods of a PWM control signal.

In some implementations an output of the method is a value representing the sensed level of light from the display. That is, this value may be used independently, without sensing the ambient light level, for example as part of a display brightness control feedback loop.

Also or instead the integrated display light level may be used to determine an ambient light level as previously described.

In some implementations the calibration value depends on the brightness of the display. For example the display brightness may be controlled by a combination of PWM and current modulation. Also or instead the sensor may see light from multiple lines (e.g. rows) of the display: In that case when the display is bright the sensor may have an aperture that sees several bright lines of the display to either side of a dark line when a dark band is centrally positioned over the sensor, but when the display is less bright the sensor may see only dark lines when a dark band is centrally positioned on the sensor and may only see bright lines when leading and training edges of the dark band move past the sensor.

Thus in some implementations the method determines an (overall) display brightness e.g. by obtaining a display brightness control value from the electronic device. For example the method may sense a signal on one or more internal control lines for the display, read a value from memory or a register, or determine the display brightness in some other way. The display brightness e.g. the display brightness control value may then be used to determine the calibration value e.g. by reading a calibration value stored in memory such as a lookup table, or by reading multiple calibration values and interpolating between or extrapolating from them. The lookup table may store a set of calibration values, one for each of a corresponding set of display brightness values or ranges. Applying the calibration value to the difference between the first and second sensed brightness levels may then comprise scaling e.g. multiplying or dividing, the difference by the calibration value.

In some implementations the sensor is configured to view just part of the display e.g. just one or a few lines of the display. The display may be PWM modulated so as to have one or move dark (reduced brightness) bands which move across the display. Then the first and second (e.g. bright and dark) brightness levels of the display may be sensed by controlling a timing of the sensing to measure brightness when the dark band is present over the sensor (the second brightness level), and when it is absent (the first brightness level). The timing may be predetermined e.g. fixed based upon knowledge of how the display/deice operates; or it may be determined dynamically i.e. by a sensing system whilst the display/device is in use.

In some implementations, therefore, the electronic device controls the display brightness by modulating the emissive display such that different regions of the emissive display are simultaneously at each of the first and second brightness levels and move across the emissive display. Then the method may further comprise using the sensor to sense light from a sensed portion of the emissive display and controlling a timing of the sensing such that the sensor senses the first and second brightness levels at different times as the different regions move over the sensed portion of the emissive display. For example the sensing may be at times, e.g. first and second times, corresponding to the first and second brightness levels (sensed by the sensor). In implementations where the timing of the sensing is variable (whether or not at predetermined points) the method may further comprise determining the calibration value dependent upon the timing. That is, a determination of the calibration value e.g. using a lookup table, may also depend on the sensing (sample) timing.

The display may refresh every display (frame) period; this may be determined using a synchronization signal. The ambient light sensing time over which the combined light level is integrated may encompass one or more complete display (frame) periods (the ambient light sensing time need not be an exact multiple of the display period).

In some implementations the first and second brightness levels of the display may be sensed in each of (n) multiple display periods encompassed by the ambient light sensing time. The method may then further comprise determining the calibration value dependent upon the number of times (n) the brightness levels of the display are sensed during the ambient light sensing time. That is, a determination of the calibration value e.g. using a lookup table, may also depend on the number of times the display brightness is sensed (sampled).

In implementations the same sensor measurements may be used for sensing the combined light level of ambient light and light from the emissive display and for sensing the first and second sensed brightness levels of the display. That is the sensor may collect measurements of the combined light level and some of these (i.e. those representing the first and second brightness levels of the display) may be differenced to suppress a contribution from the light level of ambient light.

In some implementations the method may further comprise determining a ratio of the integrated display light level to the ambient light level. The ratio may then be used as an indication of reliability of the determination of the ambient light level. For example the manner in which the overall display brightness is controlled may change depending upon an absolute brightness of the display, e.g. switching to a different PWM control technique or to a current control technique at high brightness. This can make determination of the integrated display light level (and hence also the ambient light level) unreliable. This can be flagged e.g. to software controlling the electronic device/display e.g. display brightness control software, to avoid unwanted brightness control behaviour.

The above described techniques are particularly advantageous in an electronic device in which the emissive display has rows of pixels and the sensor is located behind the emissive display such that the sensor senses light from multiple rows of pixels simultaneously. For example the sensor, i.e. a light sensing part of the sensor, may be completely behind the display, e.g. behind an emissive area of the display.

The method may further comprise determining the calibration value. This may comprise sensing (using the sensor) a combined calibration light level of ambient light and light from the emissive display, without any (external) ambient illumination (that is, with zero ambient illumination). Determining the calibration value may further comprise integrating the combined calibration light level over an ambient light sensing time to determine an integrated calibration light level. The method may further comprise determining the integrated display light level over the ambient light sensing time for the emissive display. The method may further comprise determining a ratio of the integrated calibration light level to the integrated display light level to determine the calibration value.

In another aspect there is described an electronic device having an emissive display e.g. a PWM emissive display, and a sensor. The device may be a portable and/or battery powered electronic device e.g. a smartphone or tablet. The device may be configured to modulate the emissive display between first and second brightness levels to control a display brightness of the emissive display. The device may be further configured to sense, using the sensor, a combined light level of ambient light and light from the emissive display. The device may be further configured to integrate the combined light level over an ambient light sensing time to determine an integrated light level. The device may be further configured to sense, using the sensor, a combination of light from the emissive display when at the first brightness level and the light level of the ambient light to determine a first sensed brightness level, and a combination of light from the emissive display when at the second brightness level and the light level of the ambient light to determine a second sensed brightness level. The device may be further configured to determine a difference between the first and second sensed brightness levels. The device may be further configured to apply a calibration value to the difference to determine an integrated display light level. The device may be further configured to compensate the integrated light level using the integrated display light level to determine an ambient light level.

The device may be further configured to control the display brightness in response to a display brightness control value. The device may comprise memory storing a lookup table comprising a set of the calibration values, e.g. one for each of a corresponding set of the display brightness control values.

The device may be further configured to control the display brightness by controlling one or both of a power supply, e.g. current, to the emissive display and a ratio of times for which the emissive display is at the first and second brightness levels, e.g. using a PWM technique.

The sensor may be configured to sense light from a sensed portion of the emissive display e.g. from a group or subset of lines of the display. The electronic device may be configured to control the display brightness by modulating the emissive display such that different regions of the emissive display are simultaneously at each of the first and second brightness levels and move across the emissive display. The electronic device may control a timing of the sensing such that the sensor senses the first and second brightness levels at different times as the different regions move over the sensed portion of the emissive display e.g. to sensed light from the sensed portion of the display during bight and dark intervals of PWM brightness control.

In another aspect there is provided a method of using an electronic device having a display and a sensor, comprising sensing a combined light level of ambient light and light from the display, determining a level of light from the display, adjusting the level of light from the display using a calibration value to determine an adjusted light level, and compensating the combined light level using the adjusted light level.

In another aspect there is provided an electronic device comprising a display, a sensor to sense a combined light level of ambient light and light from the display, and a processing system configured to determine a level of light from the display, adjust the level of light from the display using a calibration value to determine an adjusted light level, and compensate the combined light level using the adjusted light level.

The electronic device may be configured to implement the above described features and aspects by software controlling one or more processors of the device, or by dedicated hardware, e.g. electronic circuitry, which may be on one or more integrated circuits, or e.g. using a combination of software and hardware.

Thus there is also provided (dedicated) hardware, e.g. electronic circuitry, configured to implement a method as described above.

There is further provided processor control code to implement a system and method as described above i.e. processor control code which, when executed by a processor (computer), causes the processor to implement a system or perform a method as described. The code may be provided as a signal transmitted over a network, or on one or more computer readable media e.g. one or more physical data carriers such as a disk or programmed memory such as non-volatile memory (eg Flash) or read-only memory (Firmware). Code and/or data to implement examples of the system/method may comprise source, object or executable code in a conventional programming language, interpreted or compiled), such as C, or assembly code, or code for a hardware description language. The code and/or data to implement the systems may be distributed between a plurality of coupled components in communication with one another.

Details of these and other aspects of the system are set forth below, by way of example only.

BRIEF DESCRIPTION OF THE DRAWINGS

In the drawings like reference numerals indicate like elements.

DETAILED DESCRIPTION

This specification describes a system that can be implemented by an electronic device with a display, such as a mobile phone, to sense the brightness of ambient light. The system can be implemented by a processor of the device, or in dedicated hardware, or both.

In general terms embodiments of the system use a sensor to measure a level of ambient light without needing to switch off the display, even though the sensor picks up light from the display. For example the sensor may be located under the display in a BOLED (Behind OLED) sensor configuration.

The sensor senses the display when it is at two different brightness levels e.g. whilst the display is PWM modulated between these brightness levels to control the average display brightness. The sensor also senses the ambient light but a difference between these two brightness levels is insensitive to the ambient light level, which cancels out.

An actual time-integrated light level (brightness) is determined by time-integrating a signal or value derived from the sensor. This signal or value depends on a combined light level of the ambient light and the light from the display. The integration may be over an ambient light sensing time e.g. one or more display refresh periods.

The ambient light insensitive difference can be scaled up by a calibration value to determine what a time-integrated display light level (brightness) would be with zero ambient light if integrated over the same ambient light sensing time. The calibration value may depend on the display brightness i.e. on a control value which controls the display brightness.

Subtracting the time-integrated display light level from the actual time-integrated light level leaves the time-integrated ambient light level, which is a measure of the ambient light level.

Using a calibration value which depends on a control value which controls the display brightness automatically takes into account many unknown factors such as timing and sensor aperture errors which affect the brightness levels seen by the sensor, and details of how the device controls display brightness using e.g. PWM; all of which may be display brightness-dependent.

Figure 1A:
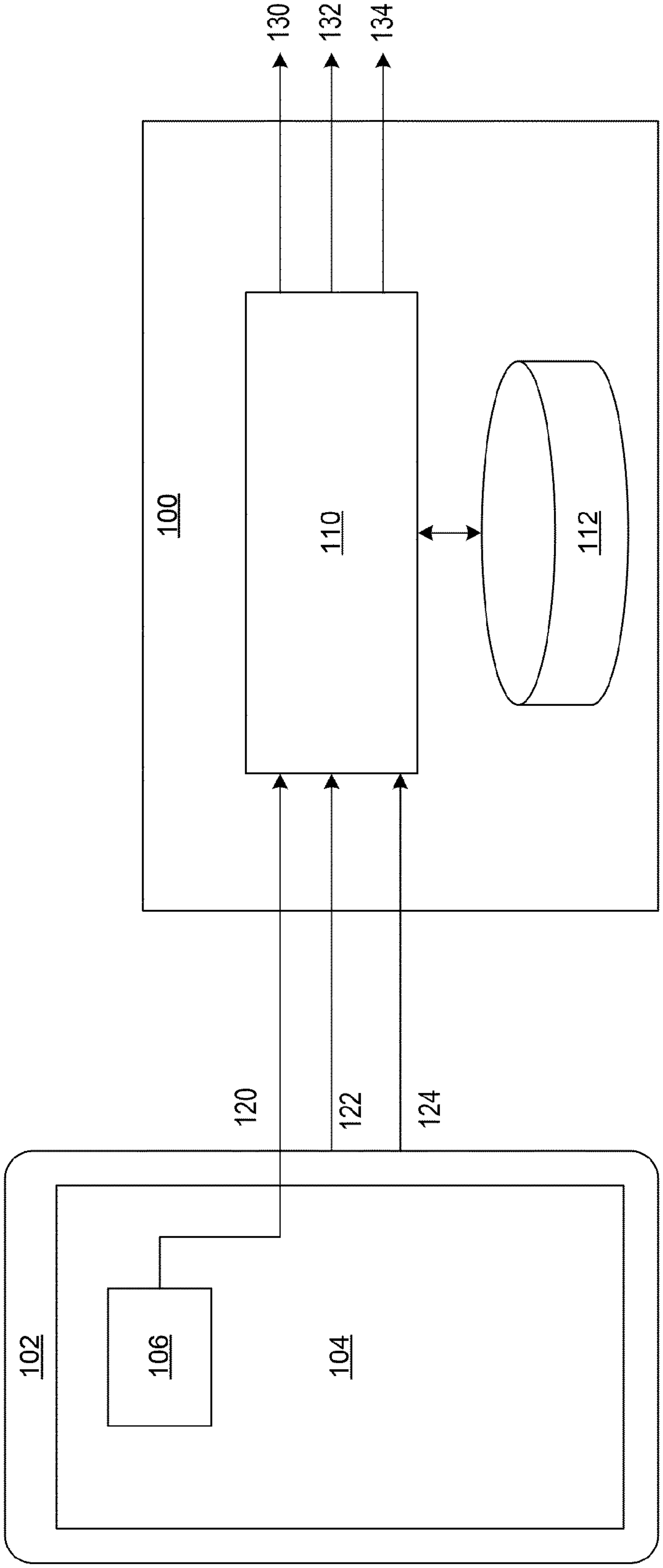
FIG. 1 shows an electronic device including an ambient light sensing system.

FIG. 1 shows an electronic device 102, such as a mobile phone or tablet, with an emissive display 104, including an ambient light sensing system 100. The emissive display 104 may comprise an OLED display screen. The device has a light sensor 106, coupled to the ambient light sensing system 100. The ambient light sensing system 100 is shown separate to the electronic device 102 for convenience, but would typically be incorporated into the electronic device.

Figure 1B:
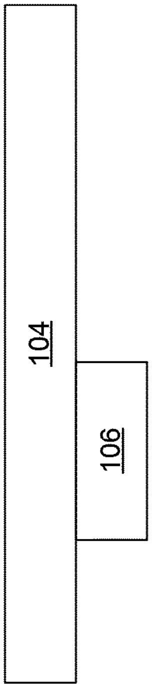

The light sensor 106 typically senses visible light. It may be mounted behind the display 104 as shown in FIG. 1*b*. In this location light-blocking parts of the display stack, such as protective barriers or metallization, may be locally removed. In some other configurations the light sensor 106 may be located behind a bezel, between the display stack and a device frame.

The ambient light sensing system 100 comprises a sensing engine 110, implemented in hardware and/or software, and configured to implement the ambient light sensing functions described later. The sensing engine 110 receives a light sensor signal 120 from the light sensor 106, and in implementations obtains a display brightness control value 124 from the electronic device 102 e.g. from a display drive part of the device. The display brightness control value 124 may, for example, be provided by a physical connection, or may be obtained from a register. The display brightness control value may be a signal which defines a brightness of the display 104.

The sensing engine 110 may also receive a synchronization signal 122 from the electronic device 102 e.g. from a display drive part of the device. In general the synchronization signal 122 is a signal which allows the ambient light sensing system 100 to sample the signal from the light sensor when the display is at two different brightness levels e.g. due to PWM modulation. For example the synchronization signal 122 may be a signal which defines a display refresh timing e.g. a vertical or frame synchronization signal, or a signal which represents a trigger point in time for display blanking i.e. which defines a time when the display brightness is reduced from a first level to a second level.

The sensing engine 110 is coupled to calibration value memory 112 which stores calibration value data for one or more calibration values, as described later. The memory 112 may be non-volatile memory. For example the calibration value data may be written once e.g. into read-only memory when the electronic device is manufactured, or the memory 112 may comprise Flash or other non-volatile memory into which the calibration value data is written when the ambient light sensing system 100 is calibrated.

The ambient light sensing system 100 generates data comprising one or more of: ambient light level data 130, display light level data 132, and measurement reliability data 134. These data may be made available on electrical connections e.g. of an integrated circuit, and/or as a readable data value in a register or memory location.

The ambient light level data 130 may comprise a value indicating a level of ambient light determined by the system. The display light level data 130 may comprise a value indicating a brightness level of the display determined by the system. The measurement reliability data 134 may comprise a value indicating a reliability of the determined level of ambient light.

Figure 2:
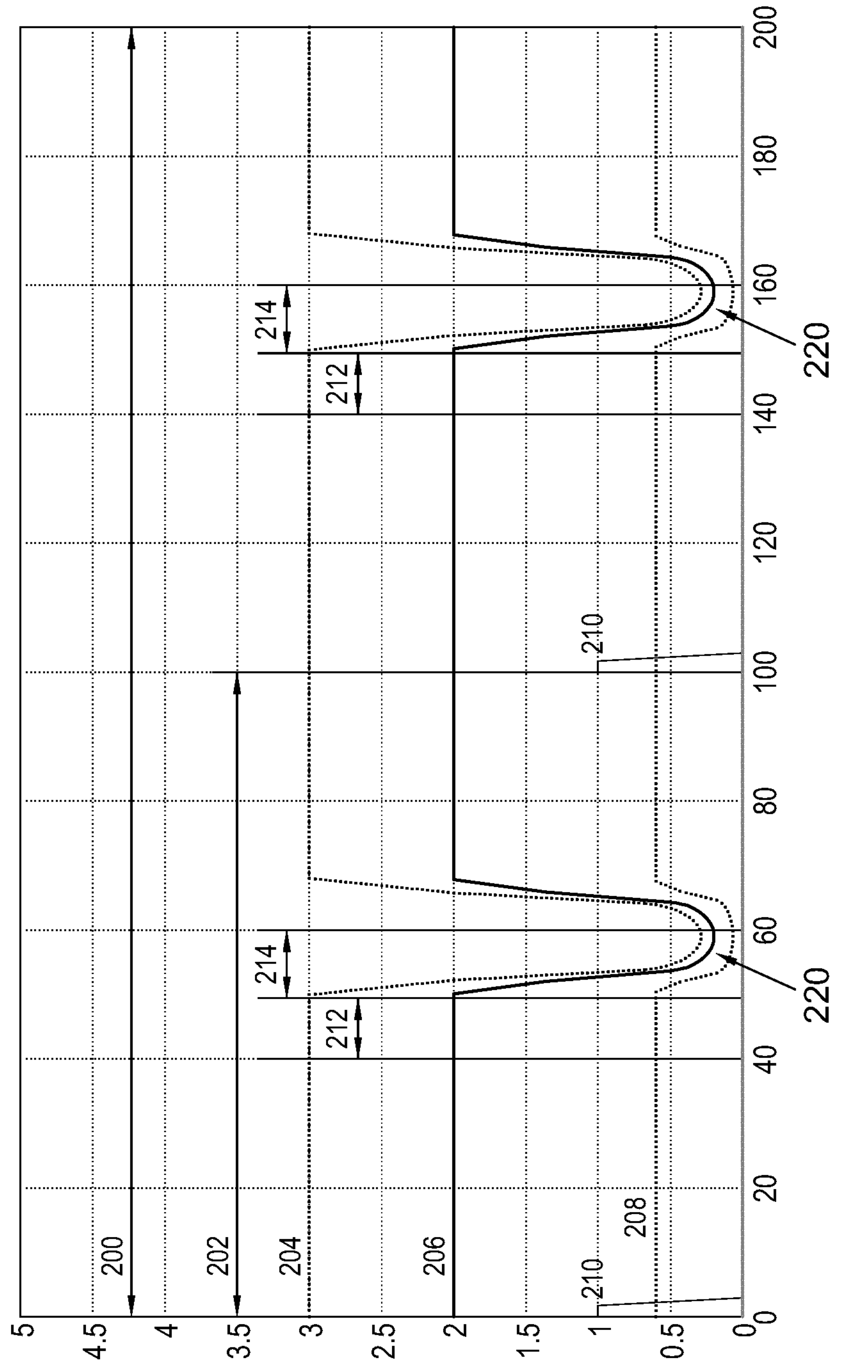
FIG. 2 shows a process for determining a level of ambient light.

FIG. 2 is a plot which schematically illustrates brightness level changes on an example pulse width modulated display. In the plot time is on the x-axis and brightness at a location of the light sensor is on the y-axis; both are in arbitrary units.

Pulse 210 is a frame synchronization signal and time period 202 represents a refresh rate of the display. Levels 204 and 208 represent a maximum and minimum levels of display brightness respectively, and level 206 represents a presently selected brightness level of the display. In the example of FIG. 2, the display brightness is PWM modulated with a dark band which travels across the display. This is illustrated by dips 220 in the brightness level 206.

Period 200 represents the ambient light sensing time. A signal from the light sensor representing a combined light level of the ambient light and the light from the display is integrated over this period. In the illustrated example period 200 extends for two display (frame) periods. The integrated combined light level is designated IntS.

The display brightness is sampled outside the dip 220 to provide a first sensed brightness level dS1, and within the dip 220 to provide a second, reduced sensed brightness level, dS2. This may be done by controlling a timing of sampling of the signal from the light sensor using the synchronization signal 122. In some implementations the timing of the samples is fixed; in others it may be controlled e.g. by an external signal of a value in a register e.g. in memory 112.

In some implementations each of the first and second sensed brightness levels, dS1, dS2, may be integrated over a sample time, in FIG. 2 periods 212, 214 respectively. In implementations the first and second sensed brightness levels are sensed at closely spaced short time intervals, e.g. over substantially adjoining sample times, so that indoors the ambient light level does not vary significantly due to the alternating current grid mains.

As illustrated, the sensor senses first during the dS1 period 212, sensing the bright display, then during the dS2 period 214, sensing the dark display. The shape and duration (length) of the dip 220, which as illustrated typically does not have vertical edges, and the physical extent of the sensor aperture, mean that the light level seen when sensing the dark display depends on the display brightness i.e. the brightness when the display is at its high rather than low PWM level.

A delta sample value, dS, may be defined as a difference between the first and second brightness levels, dS=dS1−dS2. The subtraction may be performed in the analogue or digital domain. Optionally the delta sample value may be formed from a sum or average of multiple pairs of first and second brightness levels e.g. $dS=(dS1_1-dS2_1)++(dS1_n-dS2_n)$. Each of the first and second sensed brightness levels, dS1 and dS2, is a combination of the ambient light level, Ambient, and some percentage, respectively n % and m %, of the maximum display brightness, Display. Thus:

$$dS1 \propto n\% \cdot \text{Display}+\text{Ambient}$$

$$dS2 \propto m\% \cdot \text{Display}+\text{Ambient}$$

and $$dS=\text{Display} \cdot (n\%-m\%)$$

which is independent of the ambient light level.

A ratio, dSratio, may be defined, between the integrated combined light level and the delta sample value: dSratio=IntS/dS. This is dependent on the ambient light level because IntS depends on the ambient light level. However the delta sample value may also be calculated for zero ambient light level. In this case the light sensor only sees light from the display and an integrated display light level IntD is determined, and dSratio=IntD/dS. The value of dSratio may be determined by a calibration process.

When ambient light is present the integrated combined light level comprises a sum of the integrated display light level and an integrated ambient light level IntA, i.e. the ambient light level integrated over the ambient light sensing time. Thus IntS=IntD+IntA.

The IntD component of IntS may be determined from the delta sample value dS and the dSratio. In principle a single value of dSratio might be sufficient to determine IntD. However in practice the display brightness may be controlled by controlling a combination of the brightness level 206 and a duration of the dip 220. As previously mentioned there are also other factors which mean that the light level seen when sensing the dark display may depend on the display brightness, such as timing errors, sensor aperture effects, illumination from side pixels, effects due to the finite time an OLED may take to fade, and so forth.

Therefore in implementations the dSratio calibration value is determined for each of a set of display brightness levels as defined e.g. by the display brightness control value 124. For example the memory 112 may store a calibration table defining a dSratio calibration value for each of a range of display brightness control values e.g. spanning a range of controllable brightness of the display 104.

Optionally, where the ambient light sensing system has a variable or configurable timing of the sampling of the first and second sensed brightness levels or a variable or configurable number of pairs of first and second sensed brightness levels sampled, the calibration table may also include different dSratio calibration values for each of these variable or configurable parameters.

A calibration process may be used to determine the dSratio calibration values in the calibration table. This calibration is performed at zero ambient light level, in which case the signal from the light sensor integrated over the ambient light sensing time may be taken as IntD. In implementations the calibration is performed for each of a range of display brightness control values to generate a calibration table of dSratio calibration values against display brightness control values.

Thus to determine the integrated ambient light level, IntA, the ambient light sensing system 100 measures integrated combined light level, IntS, and the first and second brightness levels dS1, dS2. The system then determines the delta sample value, dS=dS1−dS2, and uses the current display brightness control value to look up and retrieve a dSratio from the calibration table. This is used to determine a value for IntD, from IntD=dS·dSratio, and a value for IntA from $$\text{Int}A=\text{Int}S-\text{Int}D$$

Looking up the dSratio from the calibration table compensates for the various previously mentioned disturbances in sensing the brightness levels.

Figure 3:
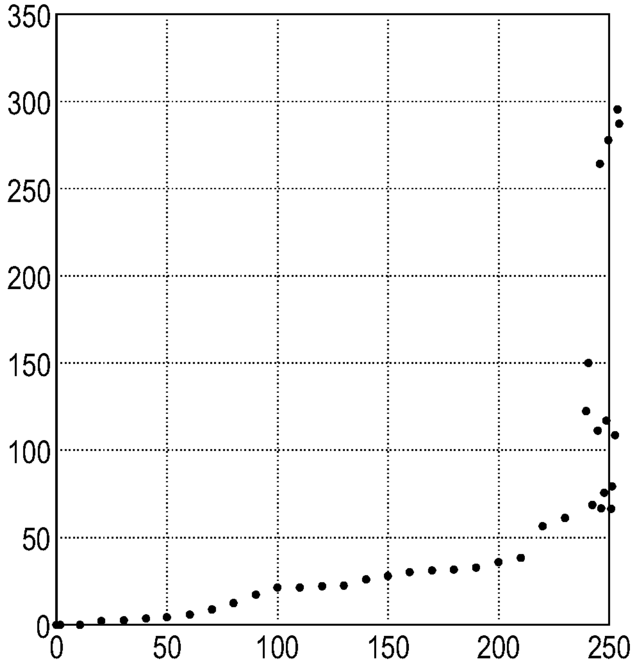
FIG. 3 shows a plot of dSratio against display brightness.

FIG. 3 shows a plot of the dSratio on the y-axis against display brightness on the x-axis; arbitrary units. In this example the value of dSratio is not constant but increases with increasing display brightness. At high brightness the plot is not monotonic; this may indicate that a different display brightness control technique is used by the electronic device at high display brightness.

Figure 4:
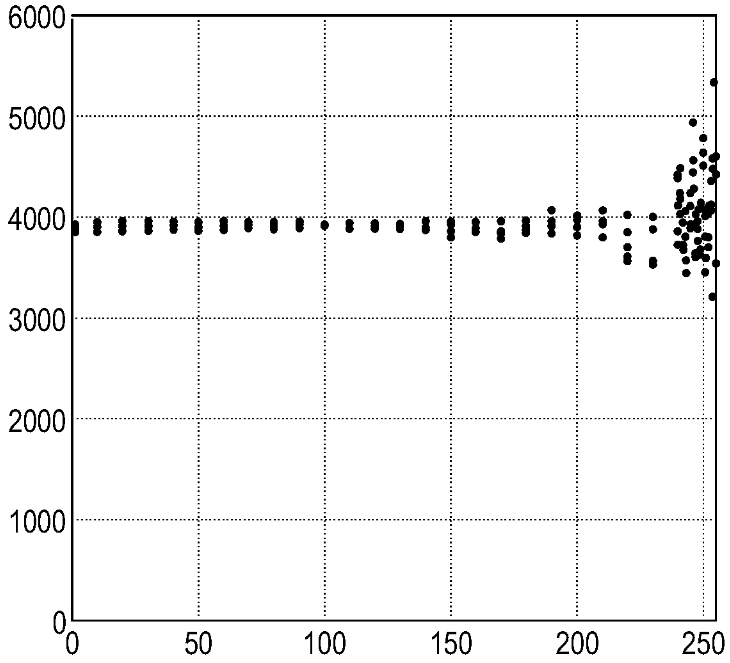
FIG. 4 shows a plot of integrated ambient light level against display brightness.

FIG. 4 shows a plot of the integrated ambient light level IntA on the y-axis against display brightness on the x-axis; arbitrary units. The points represent a range of different display colours; the ambient light level is constant at 50 Lux. It can be seen that the ambient light measurement is accurate except at maximum display brightness.

Figure 5:
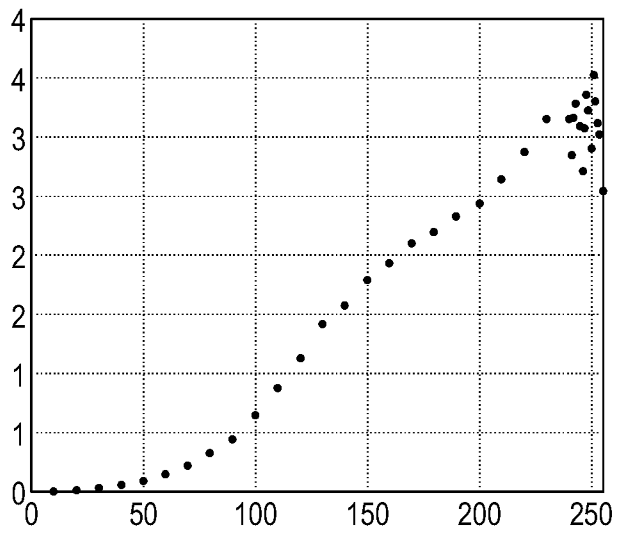
FIG. 5 shows a plot of (display light level/ambient light level) against display brightness.

FIG. 5 shows a plot of the ratio (display light level/ambient light level) on the y-axis against display brightness (in arbitrary units) on the x-axis. The display light level may be determined either from the IntD value or from the display brightness control value. The ambient light measurement is inaccurate when the ratio is large e.g. greater than a threshold, in the example greater than around 3—that is, when the display light level is much higher than ambient light level.

Thus the ratio of display light level to ambient light level may be used as an indicator of (un)reliability of the ambient light measurement, and may provide the measurement reliability data 134. The measurement reliability data may be used by display brightness control software of the electronic device to inhibit brightness control when the ambient light level measurement is unreliable, or generally to provide a weight for the ambient light measurement.

Figure 6:
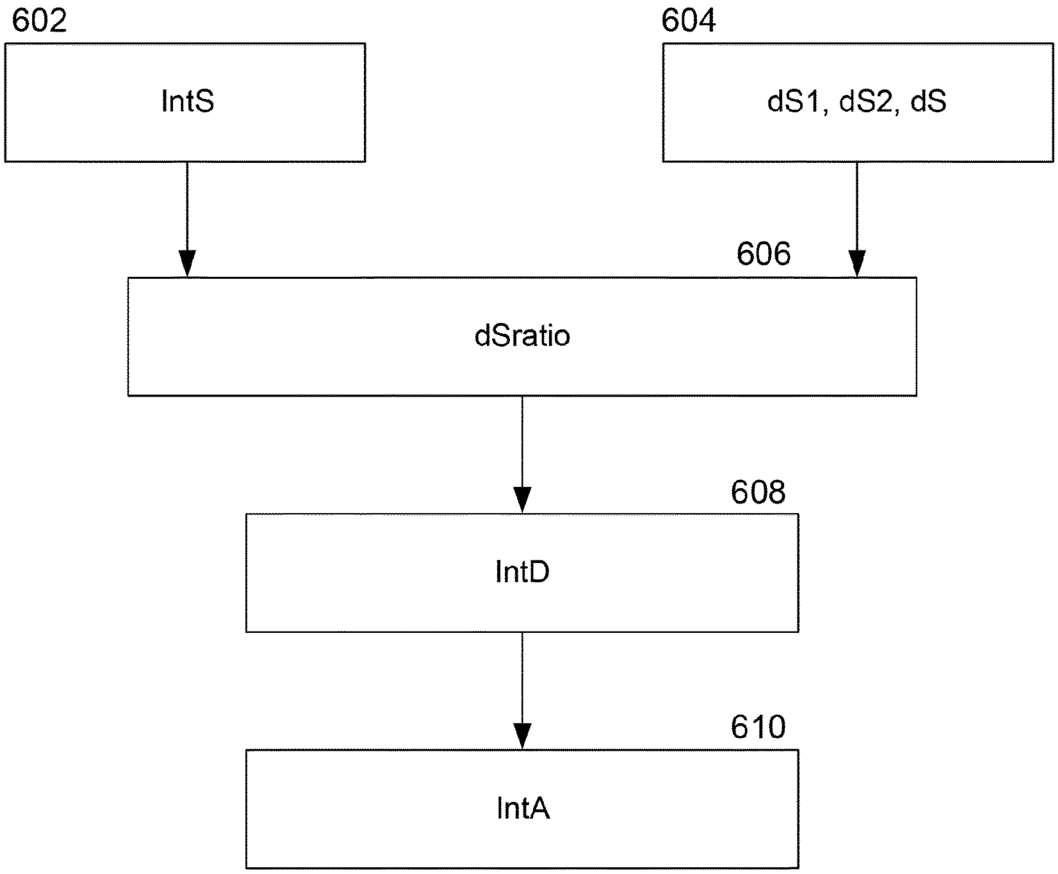
FIG. 6 shows a process for determining a level of ambient light.

FIG. 6 shows a process for determining a level of ambient light according to the above method. Thus the process uses the signal from the light sensor to determine an integrated light level, IntS (step 602), and potentially in parallel, determines the first and sensed brightness levels, dS1, dS2 (step 604). The process then obtains the display brightness control value 124 and uses this to retrieve a corresponding dSratio calibration value from memory 112 (step 606). The process then calculates a value for IntD as described above (step 608), and from that a value for IntA (step 610), which serves as a measure of the ambient light intensity. Also or instead the value of IntD may be an output of the process. Optionally the process may also provide the ratio of IntD to IntA as the measurement reliability data 134.

Figure 7:
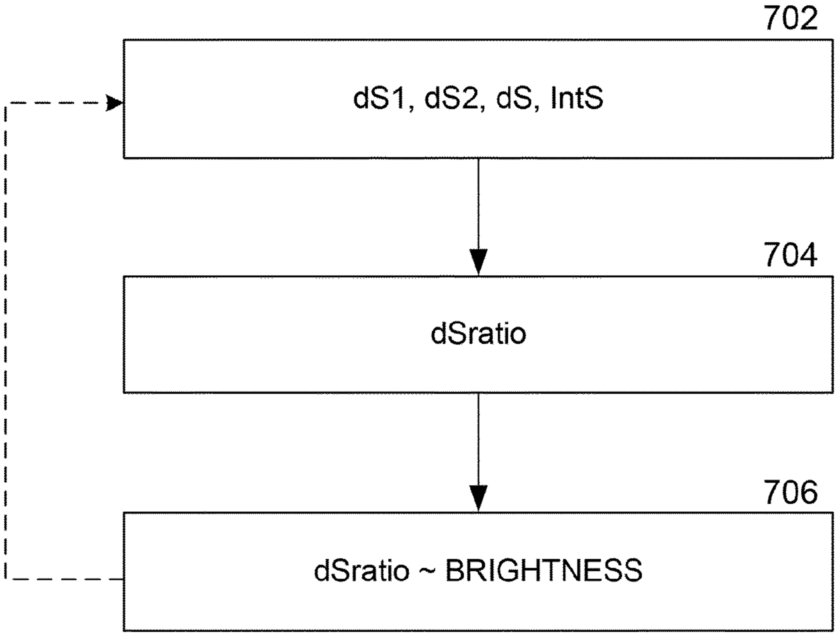
FIG. 7 shows a process to determine calibration values for a calibration table.

FIG. 7 shows a process which may be performed at zero ambient light and for each of a range of display brightness levels to determine dSratio calibration values for the calibration table. The process may be performed just once for a particular type or configuration of the electronic device 102, or for each particular electronic device 102.

The process of FIG. 7 first sets the display brightness control value and determines the integrated combined light level, IntS, and the first and second brightness levels dS1, dS2, and hence dS=dS1−dS2 (step 702). The process then calculates dSratio=IntS dS (step 704), and stores this in calibration value memory 112 in association with the set display brightness control value (step 706).

Optionally the table may also time data indicating when one or both of the first and second brightness levels are measured e.g. a time offset from the synchronization signal 122, and/or data indicating a number of pairs of first and second brightness levels used for determining dS. These may be used by the system to look up an appropriate dSratio in a system where the timing offset and/or number of pairs may be varied.

The process then sets a further display brightness control value and loops back to step 702 until the calibration table is complete. When complete the table may store e.g. in the range 10-100 pairs of values in the calibration value memory 112.

Implementations of the above described system and method permit ambient light sensing from behind a display e.g. an OLED display and work well, that is can provide high accuracy, even with PWM displays operating at a very high duty cycle i.e. high brightness; short display blanking times can also be tolerated.

When implemented in hardware the above described system and method needs less die area and can be less complex than some existing techniques.

The system implementation and described calibration process together can reduce ambient light sensing errors resulting from misalignment of the light sensor, device fabrication tolerances, display fading and other effects.

LIST OF REFERENCE NUMERALS

100 ambient light sensing system
102 electronic device
104 emissive display
106 light sensor
110 sensing engine
112 calibration value memory
120 light sensor signal
122 synchronization signal
124 display brightness control value
130 ambient light level data
132 display light level data
134 measurement reliability data
200 ambient light sensing time
202 refresh rate of the display
204 maximum level of display brightness
206 presently selected brightness level of the display
208 minimum level of display brightness
210 frame synchronization signal
212 first sensed brightness level sample time
214 second sensed brightness level sample time
220 dip in brightness level
602 determine integrated light level IntS
604 determine first and sensed brightness levels dS1, dS2
606 retrieve dSratio calibration value from memory
608 calculate value for IntD
610 calculate value for IntA
702 set display brightness control value and determine IntA, dS1, dS2, dS
704 calculate dSratio
706 store dSratio in calibration value memory with display brightness control value Features of the method and system which have been described or depicted herein in combination e.g. in an embodiment, may be implemented separately or in sub-combinations. Features from different embodiments may be combined. Thus each feature disclosed or illustrated in the present specification may be incorporated in the invention, whether alone or in any appropriate combination with any other feature disclosed or illustrated herein. Method steps should not be taken as requiring a particular order e.g. that in which they are described or depicted, unless this is specifically stated. A system may be configured to perform a task by providing processor control code and/or dedicated or programmed hardware e.g. electronic circuitry to implement the task.

Aspects of the method and system have been described in terms of embodiments but these embodiments are illustrative only and that the claims are not limited to those embodiments. Those skilled in the art will be able to make modifications and alternatives in view of the disclosure which are contemplated as falling within the scope of the claims.

The invention claimed is:

1. A method of sensing a level of ambient light in an electronic device having an emissive display and a sensor, comprising:

sensing, using the sensor, a combined light level of ambient light and light from the emissive display;

integrating the combined light level over an ambient light sensing time to determine an integrated combined light level, wherein the integrated combined light level comprises an average combined light level over the ambient light sensing time;

determining an integrated display light level over the ambient light sensing time for the emissive display; and compensating the integrated combined light level using the integrated display light level to determine a calculated ambient light level, wherein the compensating comprises determining a difference between the integrated combined light level and the integrated display light level;

wherein the electronic device controls a display brightness of the emissive display by modulating the emissive display between first and second brightness levels; and wherein determining the integrated display light level comprises:

sensing, using the sensor, a combination of light from the emissive display when at the first brightness level and the light level of the ambient light to determine a first sensed brightness level, and a combination of light from the emissive display when at the second brightness level and the light level of the ambient light to determine a second sensed brightness level;

determining a difference between the first and second sensed brightness levels to suppress a contribution from the light level of ambient light; and applying a calibration value to the difference to determine the integrated display light level.

2. The method as claimed in claim 1 wherein applying the calibration value comprises obtaining a display brightness control value from the electronic device, wherein the display brightness control value defines the display brightness, and determining the calibration value dependent upon the display brightness control value.

3. The method as claimed in claim 2 wherein determining the calibration value comprises reading one or more calibration values from a lookup table indexed by the display brightness control value to determine the calibration value; and wherein applying the calibration value to the difference comprises scaling the difference by the calibration value.

4. The method as claimed in claim 1 wherein the electronic device controls the display brightness by modulating the emissive display such that different regions of the emissive display are simultaneously at each of the first and second brightness levels and move across the emissive display, the method further comprising using the sensor to sense light from a sensed portion of the emissive display and controlling a timing of the sensing such that the sensor senses the first and second brightness levels at different times as the different regions move over the sensed portion of the emissive display.

5. The method as claimed in claim 4 wherein the timing of the sensing is variable, the method further comprising determining the calibration value dependent upon the timing.

6. The method as claimed in claim 1 wherein the electronic device is configured to refresh the emissive display every display period and the ambient light sensing time includes a set of n display periods, where n>1; wherein determining the integrated display light level comprises sensing each of the first and second brightness levels in each of multiple display periods; and wherein the calibration value is dependent upon n.

7. The method as claimed in claim 1 wherein sensing, using the sensor, the combined light level of ambient light and light from the emissive display includes sensing, using the sensor, a combination of each of the first and second brightness levels and the light level of ambient light, to determine respective first and second sensed brightness levels.

8. The method as claimed in claim 1 further comprising determining a ratio of the integrated display light level to the ambient light level, and using the ratio as an indication of reliability of the determination of the ambient light level.

9. The method as claimed in claim 1 wherein the emissive display has rows of pixels, the method further comprising locating the sensor behind the emissive display such that the sensor senses multiple rows of pixels.

10. The method as claimed in claim 1 further comprising determining the calibration value by: sensing, using the sensor, a combined calibration light level of ambient light and light from the emissive display, wherein the sensing is performed without any ambient illumination; integrating the combined calibration light level over an ambient light sensing time to determine an integrated calibration light level; determining the integrated display light level over the ambient light sensing time for the emissive display; and determining a ratio of the integrated calibration light level to the integrated display light level to determine the calibration value.

11. A processor control code, or one or more computer readable media storing processor control code, to implement the method of claim 1.

12. An electronic device having an emissive display and a sensor, wherein the electronic device is configured to:

modulate the emissive display between first and second brightness levels to control a display brightness of the emissive display;

sense, using the sensor, a combined light level of ambient light and light from the emissive display;

integrate the combined light level over an ambient light sensing time to determine an integrated combined light level, wherein the integrated combined light level comprises an average combined light level over the ambient light sensing time;

sense, using the sensor, a combination of light from the emissive display when at the first brightness level and the light level of the ambient light to determine a first sensed brightness level, and a combination of light from the emissive display when at the second brightness level and the light level of the ambient light to determine a second sensed brightness level;

determine a difference between the first and second sensed brightness levels; and apply a calibration value to the difference to determine an integrated display light level; and compensate the integrated combined light level using the integrated display light level to determine a calculated ambient light level by at least determining a difference between the integrated combined light level and the integrated display light level.

13. The electronic device as claimed in claim 12 configured to control the display brightness in response to a display brightness control value; the electronic device further comprising memory storing a lookup table comprising a set of the calibration values, one for each of a corresponding set of the display brightness control values.

14. The electronic device as claimed in claim 13 configured to control the display brightness by controlling one or both of a power supply to the emissive display and a ratio of times for which the emissive display is at the first and second brightness levels.

15. The electronic device as claimed in claim 12 wherein the sensor is configured to sense light from a sensed portion of the emissive display; wherein the electronic device is configured to control the display brightness by modulating the emissive display such that different regions of the emissive display are simultaneously at each of the first and second brightness levels and move across the emissive display, and is further configured to control a timing of the sensing such that the sensor senses the first and second brightness levels at different times as the different regions move over the sensed portion of the emissive display.

* * * * *